United States Patent
Irish et al.

[15] 3,642,303
[45] Feb. 15, 1972

[54] VEHICLE OCCUPANT RESTRAINT SYSTEM

[72] Inventors: Fred J. Irish, Pontiac; Robert F. McLean, Birmingham, both of Mich.

[73] Assignee: General Motors Corporation, Detroit, Mich.

[22] Filed: Feb. 13, 1970

[21] Appl. No.: 11,148

[52] U.S. Cl. .................................................. 280/150 AB
[51] Int. Cl. ............................................................. B60r 21/10
[58] Field of Search ............... 280/150 AB, 150 B; 244/121, 244/122

[56] References Cited

UNITED STATES PATENTS

| | | | |
|---|---|---|---|
| 3,414,292 | 12/1968 | Oldberg et al. | 280/150 |
| 3,197,234 | 7/1965 | Bertrand | 280/150 |
| 3,451,693 | 6/1969 | Carey | 280/150 |
| 2,834,606 | 5/1958 | Bertrand | 280/150 |
| 2,418,798 | 4/1947 | Whitmer | 244/121 |
| 3,243,822 | 4/1966 | Lipkin | 280/150 |
| 3,430,979 | 3/1969 | Terry et al. | 280/150 |
| 3,473,824 | 10/1969 | Carey et al. | 280/150 |
| 3,527,475 | 9/1970 | Carey et al. | 280/150 |

*Primary Examiner*—Kenneth H. Betts
*Attorney*—W. E. Finken, A. M. Heiter and R. L. Phillips

[57] ABSTRACT

A vehicle occupant restraint system having a plurality of bags which are inflated on vehicle impact with a stationary or moving object. One of the bags receives the impact of the occupant's torso and on such impact, has controlled pressure relief to prevent excessive rebounding of the occupant. Another bag receives the impact of the occupant's head and has controlled pressure relief to prevent excessive relative movement between the occupant's head and torso. A third bag receives the impact of the occupant's legs and remains inflated on impact by the occupant to maintain the occupant in the normal seated position.

8 Claims, 3 Drawing Figures

PATENTED FEB 15 1972

3,642,303

INVENTORS
Fred J. Irish &
BY Robert F. McLean

Ronald L. Phillips
ATTORNEY

VEHICLE OCCUPANT RESTRAINT SYSTEM

This invention relates to vehicular occupant restraint systems and more particularly to multiple bag restraint systems for restraining vehicle occupants on vehicle impact with a stationary or moving object.

In a vehicle having a single bag or cushion that is inflated on vehicle impact with a stationary or moving object, an occupant may rebound off the inflated bag on impact therewith and may also become dislodged from the seat if he is not otherwise restrained by a belt restraint arrangement.

The vehicle occupant restraint system according to the present invention comprises a plurality of bags that are inflated on vehicle impact with a stationary or moving object. On inflation, one of these bags expands to receive the impact of the occupant's torso and then on such impact, has controlled pressure relief to cushion the occupant while acting to prevent excessive rebound of the occupant's torso. Another bag expands to receive the impact of the occupant's head and then on such impact also has controlled pressure relief to cushion the occupant's head while controlling relative angular movement between the occupant's head and torso. A third bag expands to receive the impact of the occupant's legs and remains inflated on such impact and acts to maintain the occupant in the normal seated position. The bags may be inflated through a single manifold from a single fluid pressure source and may also be inflated through separate manifolds from separate fluid pressure sources.

An object of the present invention is to provide an inflatable vehicle occupant restraint system that operates to prevent excessive rebounding of the occupant and also maintains the occupant in the normal seated position.

Another object is to provide a multiple bag vehicle occupant restraint system in which one bag acts to cushion the impact of the occupant while preventing excessive rebound thereof and other bag operates to maintain the occupant in the normal seated position.

Another object is to provide in a vehicle an occupant restraint system that operates to simultaneously inflate at least two inflatable bags with one bag on inflation operating to receive impact of the occupant's torso and to prevent excessive rebound thereof through pressure relief while the other bag remains inflated on impact by the occupant's legs and acts to retain the occupant on the seat.

Another object is to provide in a vehicle an occupant restraint system that is inflatable to receive impact of both the occupant's head and torso and prevent excessive rebound of the torso while controlling relative angular movement between the torso and head and also to receive the impact of the occupant's legs to prevent dislodgement of the occupant from the seat.

These and other objects of the present invention will be more apparent from the following description and drawing in which.

Figure 1:
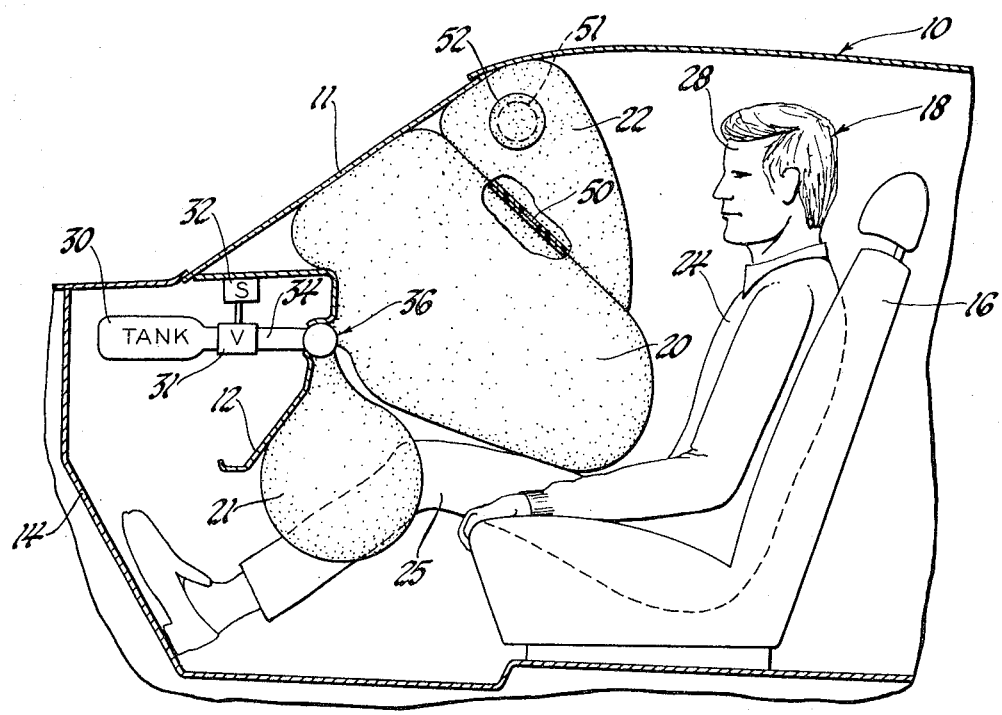
FIG. 1 is a side elevation with parts broken away of a vehicle having an occupant restraint system according to the present invention wherein the bags are inflated through a single manifold from a single fluid pressure source.

Referring to FIG. 1, there is shown a vehicle 10 having a windshield 11, an instrument panel 12, a toeboard 14 and a seat 16 on which a vehicle occupant 18 sits.

The occupant restraint system according to the present invention comprises three inflatable bags 20, 21 and 22 which are normally stowed in a collapsed, folded position on the lower edge of the instrument panel 12. The bags 20, 21 and 22, when inflated with fluid pressure, expand to the positions shown with bag 20 located intermediate the other bags. The bag 20, which may also be called a torso bag, is conditioned when inflated to receive the impact of the occupnat's torso 24 and prevent contact of the torso with instrument panel 12. Bag 21, which may also be called a knee bag, is conditioned when inflated to receive the impact of the occupant's legs 25 below the knees and prevent contact of the legs with instrument panel 12. The bag 22, which may also be called a head bag, is conditioned when inflated to receive the impact of the occupant's head 28 and prevent contact of the head with windshield 11.

The fluid for inflating the bags 20, 21 and 22 is normally stored under pressure in a pressure vessel or tank 30. Fluid pressure delivery for bag inflation is controlled by a valve 31 which is normally closed and is opened by a sensing device 32 that senses impact of the vehicle with a stationary or moving object. Both the valve 31 and the sensing device 32 may be of any appropriate type. When valve 31 is opened on vehicle impact, the fluid under pressure in tank 30 is delivered through a pipe 34 to a manifold 36 that is connected to deliver fluid to all the bags.

Figure 2:
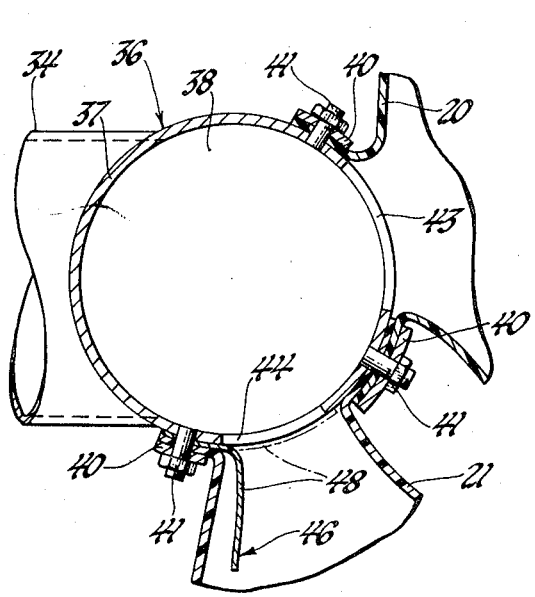
FIG. 2 is an enlarged cross-sectional view of the manifold shown in FIG. 1.

The manifold 36 is mounted adjacent the lower edge of instrument panel 12 and as best shown in FIG. 2, comprises a cylinder 37 that is closed at both ends to form a chamber 38 that is open to pipe 34. The torso bag 20 has a throat which is sealingly clamped completely along its lip to the outer surface of the manifold cylinder 37 by a clamp 40 and bolts 41. The manifold cylinder 37 has an axially extending slot 43 that provides a continuous fluid connection between manifold chamber 38 and the interior of torso bag 20. The throat of the knee bag 21 is sealingly clamped completely along its lip to another portion of the outer surface of cylinder 37 by a clamp formed integral with clamp 40. An axially extending slot 44 in cylinder 37 provides for fluid delivery from manifold chamber 38 to the interior of knee bag 21.

Fluid is permitted to travel from manifold 36 to fill knee bag 21 but is prevented from flowing in the reverse direction by a one-way valve 46 comprising a valve member 48 that extends axially along the external surface of cylinder 37 beyond both ends of slot 44. The valve member 48 is secured along one axially extending edge by one axial row of the clamp bolts 41 and is free at its ends and the other axially extending edge. The valve member 48 has spring characteristics such that when there is no pressure differential between manifold 36 and knee bag 21, the valve member 48 assumes the normal position shown in dash line in which it seats on cylinder 37 to close or block the slot 44. When fluid pressure is supplied to manifold 36, the valve member 48 is moved by this pressure to the full line position shown to provide communication between manifold 36 and knee bag 21.

The head bag 22 is secured to the top of torso bag 20 by any appropriate means or may be integral therewith. The interior of head bag 22 is connected through an orifice 50 to the interior of torso bag 20 and is also openable to the atmosphere through an orifice 51 that has a flow area larger than orifice 50. Orifice 51 is normally closed by a patch 52 which is releasably sealingly secured to the exterior of head bag 22.

Describing now the operation of the occupant restraint system shown in FIGS. 1 and 2, the valve 31 is normally closed with the bags 20, 21 and 22 deflated and stored in a folded position along the dash 12. Then when the vehicle impacts a stationary or moving object, the sensing device 32 operates to effect opening of valve 31 to permit fluid delivery from tank 30 to manifold 36. The manifold 36 distributes the fluid directly to torso bag 20 and knee bag 21, the one-way valve 46 opening to permit the fluid delivery to knee bag 21. The torso bag 20 then exhausts fluid through orifice 50 to head bag 21 which is thus filled later than the torso bag and knee bag. Preferably, the stored pressure in tank 30, the sizes of the manifold openings to the torso bag and knee bag and the size of the torso bag opening to the head bag are determined in relation to the volumes of these bags so that pressure builds to high, low and intermediate values in the knee, head and torso bags, respectively, prior to these bags being impacted by the occupant.

On impact of the occupant's torso 24 with the thus inflated torso bag 20, the intermediate pressure therein is increased sufficiently by this impact to force additional fluid through orifice 50 into head bag 22 resulting in controlled pressure relief of the torso bag 20 as the impact of the occupant's torso with this bag continues with the bag then collapsing about the occupant's torso to provide a very soft cushion therefor and to prevent excessive rebound thereof.

On impact of the occupant's head 28 with the thus inflated head bag 22, the low pressure therein is increased sufficiently by this impact to blow off patch 52 so that there is then provided controlled pressure relief through orifice 51 to the atmosphere. The orifice 50, since it provides more flow restriction than orifice 51, permits the latter orifice to control the collapse of head bag 22 at a faster rate than torso bag 20 to thereby control the relative angular movement between the occupant's head and torso.

On inflation of the knee bag 21, the one-way valve 46 opened to permit such inflation. Then on impact of this bag by the occupant's legs, the one-way valve 46 closes so that this bag remains inflated with the high pressure while the torso bag 20 and head bag 22 are being relieved of pressure. Inflation of the knee bag 21 is maintained to restrain the occupant in the seat 16 by preventing him from slipping downward and toward the front of the vehicle.

Figure 3:
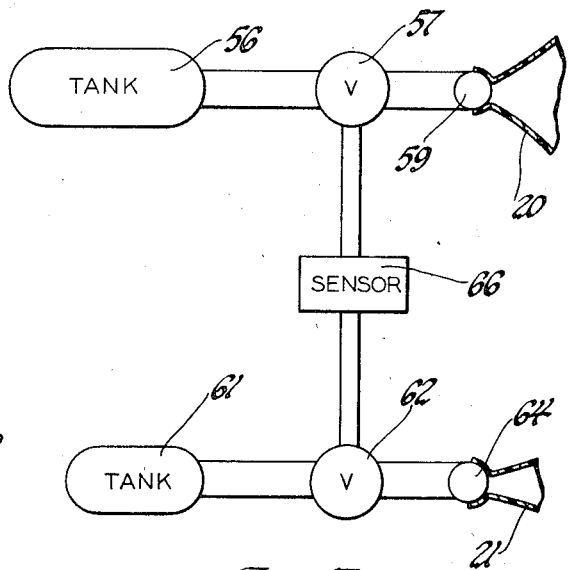
FIG. 3 is a schematic view of a multiple manifold—multiple fluid pressure source arrangement for inflating the bags shown in FIG. 1.

The multiple manifold—multiple fluid pressure source arrangement shown in FIG. 3 for the bag arrangement shown in FIG. 1 comprises a tank 56 that is connected by a valve 57 to a manifold 59 that directs fluid to the torso bag 20 and thus to the head bag. Another tank 61 is connected by a valve 62 to a manifold 64 that directs fluid to the knee bag 21. Both valves 57 and 62 are controlled by a vehicle impact sensor 66 to simultaneously open on vehicle impact. Thus, in the FIG. 3 arrangement, the knee bag remains inflated while the torso bag and head bag collapse on impact by the occupant since the knee bag and torso bag in this arrangement have separate pressure supplies. Furthermore, the FIG. 3 arrangement enables easy determination of the three different pressure zones provided by the three bags.

The above embodiment is illustrative of the present invention which may be modified within the scope of the appended claims.

We claim:

1. In a vehicle occupant restraint system the combination of first inflatable bag means that on inflation by fluid pressure assumes a position to receive impact of a vehicle occupant's torso; second inflatable bag means that on inflation by fluid pressure assumes a position to receive impact of the occupant's legs to maintain the occupant in a seated position; fluid delivery means for delivering fluid under pressure simultaneously to said first and second inflatable bag means; said fluid delivery means comprising a manifold continuously open to said first inflatable bag means and one-way valve means for opening said manifold to said second inflatable bag means; and said first inflatable bag means including flow restriction means for relieving pressure in said first inflatable bag means by restricting flow therefrom when said first inflatable bag means is impacted by the occupant's torso while pressure is maintained in said second inflatable bag means.

2. In a vehicle occupant restraint system the combination of first inflatable bag means that on inflation by fluid pressure assumes a position to receive impact of a vehicle occupant's torso; second inflatable bag means that on inflation by fluid pressure assumes a position to receive impact of the occupant's legs to maintain the occupant in a seated position; manifold means for delivering fluid under pressure simultaneously to said first and second inflatable bag means; said manifold means including one-way valve means for opening said manifold means to said second inflatable bag means; third inflatable bag means that on inflation by fluid pressure assumes a position to receive the impact of the occupant's head; said first inflatable bag means including flow restriction means for delivering fluid from said manifold means to said third inflatable bag means and also for relieving pressure in said first inflatable bag means by restricting flow from said first inflatable bag means to said third inflatable bag means when said first inflatable bag means is impacted by the occupant's torso; and said third inflatable bag means including flow restriction means for relieving pressure in said third inflatable bag means by restricting flow from said third inflatable bag means to the atmosphere when said third inflatable bag means is impacted by the occupant's head.

3. In combination with a vehicle including a seat for supporting an occupant in seated position and a source of pressure fluid, an occupant restraint system comprising, first inflatable cushion means engageable by the torso of the seated occupant, second inflatable cushion means engageable by the legs of the seated occupant, means communicating the first and second cushion means with the pressure fluid source for inflation thereof, means communicating the first cushion means with the atmosphere to exhaust pressure fluid from the first cushion means upon the pressure therein exceeding a predetermined level, and means maintaining the pressure fluid within the second cushion means upon inflation thereof, the first and second cushion means cooperating to maintain the occupant in a seated position upon engagement thereof by the occupant.

4. The combination recited in claim 3 including third inflatable cushion means engageable by the head of the seated occupant, and means communicating the third cushion means with the pressure fluid source for inflation thereof.

5. The combination recited in claim 3 wherein the first cushion means is continuously open to the pressure fluid source, the means maintaining the pressure fluid within the second cushion means upon inflation thereof including means limiting the flow of pressure fluid only from the second cushion means to the source.

6. The combination recited in claim 3 wherein the means communicating the first and second cushion means with the pressure fluid source include a manifold open continuously to the first cushion means, the means maintaining the pressure fluid within the second cushion means upon inflation thereof including means permitting flow of pressure fluid from the manifold to the second cushion means and restricting flow of pressure fluid from the second cushion means to the manifold.

7. In combination with a vehicle including a seat for supporting an occupant in seated position and a source of pressure fluid, an occupant restraint system comprising, first inflatable cushion means engageable by the torso of the seated occupant, second inflatable cushion means engageable by the legs of the seated occupant, common fluid delivery means simultaneously communicating the first and second cushion means with the pressure fluid source for inflation thereof, means communicating the first cushion means with the atmosphere to exhaust pressure fluid from the first cushion means upon the pressure therein exceeding a predetermined level, and means maintaining the pressure fluid within the second cushion means upon inflation thereof, the first and second cushion means cooperating to maintain the occupant in a seated position upon engagement thereof by the occupant.

8. The combination recited in claim 7 including third inflatable cushion means engageable by the head of the seated occupant, and means communicating the third inflatable cushion means with the second inflatable cushion means for inflation thereof from the pressure fluid source.

* * * * *